United States Patent [19]

Monzel

[11] Patent Number: 5,251,985
[45] Date of Patent: Oct. 12, 1993

[54] SQUEEZE FILM DAMPER SEAL
[75] Inventor: Fred J. Monzel, Loveland, Ohio
[73] Assignee: General Electric Company, Cincinnati, Ohio
[21] Appl. No.: 765,768
[22] Filed: Sep. 26, 1991
[51] Int. Cl.⁵ .......................................... F16C 27/00
[52] U.S. Cl. .................................................. 384/99
[58] Field of Search ............... 384/99, 130, 535, 581, 384/152

[56] References Cited

U.S. PATENT DOCUMENTS

| 4,337,983 | 7/1982 | Hibner . | |
| 4,669,893 | 6/1987 | Chalaire et al. | 384/99 |
| 5,048,978 | 9/1991 | Singh | 384/99 |
| 5,056,935 | 10/1991 | Singh | 384/99 |
| 5,071,262 | 12/1991 | Monzel et al. | 384/99 |

OTHER PUBLICATIONS

Experimental Measurement of the Dynamic Force Response of a Squeeze Film Bearing Damper, Vance and Kirton, "Transactions of the ASME," Nov., 1975, p. 1283.

Primary Examiner—Lenard A. Footland
Attorney, Agent, or Firm—Jerome C. Squillaro; John R. Rafter

[57] ABSTRACT

A conical spring ring oil seal at the ends of a squeeze film shaft damper replaces conventional internal piston ring seals to provide circumferential oil sealing of an annular squeeze film space in the damper.

3 Claims, 4 Drawing Sheets

SQUEEZE FILM DAMPER SEAL

BACKGROUND OF THE INVENTION

This invention relates to squeeze film dampers, and more particularly to squeeze film dampers having a spring ring seal to provide improved oil supply, maintenance and conservation in the damper.

Squeeze film dampers as associated with rotor shaft bearings of high speed turbo machinery, for example, hot gas turbine engines such as aircraft gas turbine engines, generally include a bearing support member such as the outer annular race of a rolling element bearing fitted into an annular chamber in the bearing housing in which it is permitted to have some limited radial motion. The annular race fits closely in its annular chamber to define a thin annular squeeze film space between the circular planar outer surface of the race and its opposing housing wall of the annular chamber. A damper fluid such as an oil is introduced into the squeeze film space to produce hydrodynamic forces that provide beneficial damping during rotational imbalance conditions. Appropriate seals are fitted at the opposite sides or ends of the squeeze film space to limit oil flow out of the sqeeze film space. Damper oil problems associated with a damper as described include overcoming high oil pressure in a damper to replenish lost damper oil, maintaining effective amounts of oil within the damper, and, effectively controlling necessary oil flow through the seals and out of the damper during its operation.

OBJECTS OF THE INVENTION

It is an object of this invention to improve control of oil flow in a squeeze film damper.

It is a further object of this invention to provide improved oil flow conserving seals in a squeeze film damper.

It is another object of this invention to provide an improved oil system in a spring ring seal/squeeze film damper combination.

SUMMARY OF THE INVENTION

Spring ring type seals are substituted for the usual piston ring seals in squeeze film dampers to provide more available space and location for oil plenums in the squeeze film space and a more constant and continuous circumferential oil seal.

This invention will be better understood when taken in connection with the following drawings and their description.

DESCRIPTION OF PREFERRED EMBODIMENTS

Figure 1:
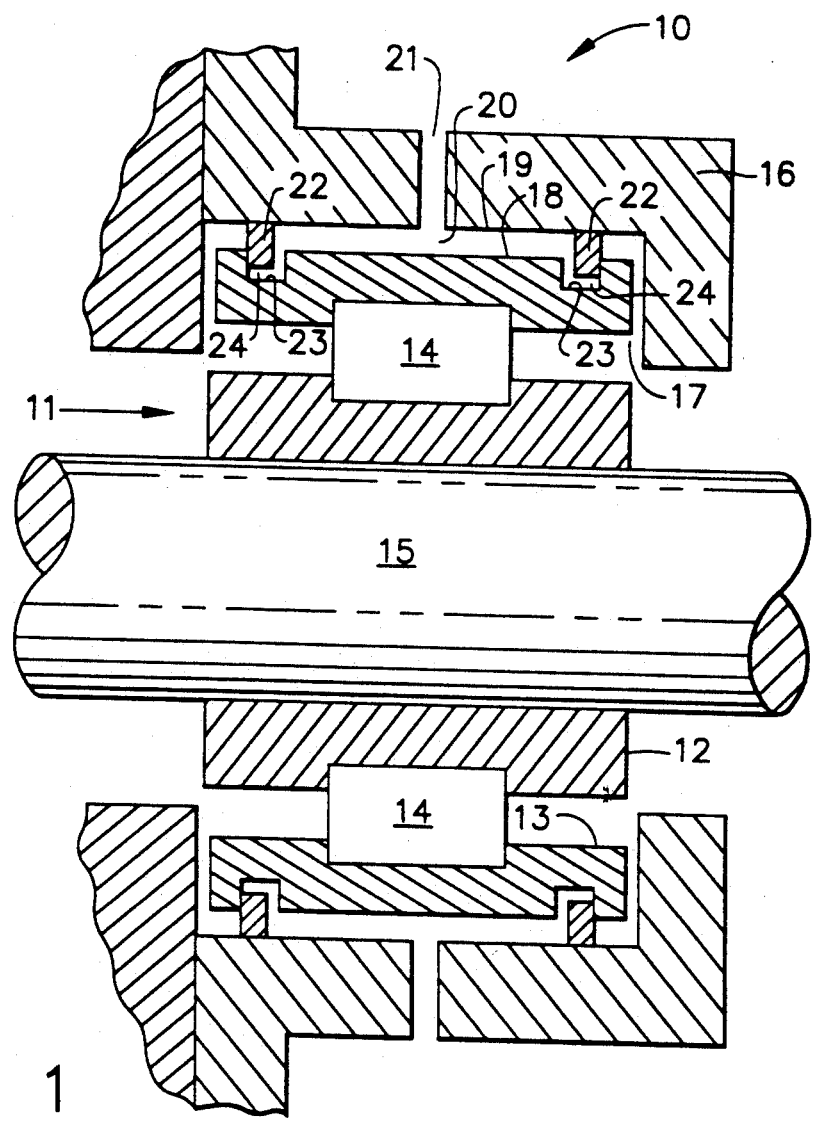
FIG. 1 is a partial and schematic illustration of a squeeze film damper to which this invention may be advantageously applied.

Referring now to FIG. 1, a squeeze film damper 10 is combined with a rolling element bearing assembly 11. Bearing assembly 11 comprises an inner race 12 and a spaced outer annular race 13 with a row of rolling elements 14 therebetween. Inner race 12 is fitted on a shaft 15 such as a turbine rotor shaft of a hot gas turbine engine for rotation on rolling elements 14. A supporting housing 16 for bearing assembly 11 includes an annular chamber 17 therein, and outer race 13 is fitted or positioned in chamber 17 to have limited radial motion therein. The outer circumferential planar surface 18 of annular race 13 is closely adjacent the inner circumferential surface 19 of annular chamber 17 to define an annular thin squeeze film space 20. A damper fluid such as an oil is introduced into space 20 through an inlet conduit 21 from an appropriate source (not shown) of damper oil under pressure.

During operation of the damper assembly, a shaft/rotor imbalance may cause shaft 15 and its associated bearing assembly 11 to undergo radial and orbital motion and subject the oil in squeeze film space 20 to very high pressure.

In order to seal damper oil in squeeze film space 20 it has been a practice to use pairs of spaced piston ring type seals 22 residing in spaced ring grooves 23 in race 13 and bearing against the opposed wall 19 of chamber 17. Oil flowing past these ring seals is collected, cooled if necessary, and recirculated to the damper. In order to assist ring sealing, piston rings 22 are spaced from the bottom of their grooves 23 to define gland spaces 24 which are in fluid flow communication with squeeze film space 20. As a consequence, high pressure from squeeze film space 20 is brought to bear against the inner periphery of rings 22 to urge them into firmer sealing engagement with the opposing wall 19 of chamber 17. Orbiting motion of shaft 15 generates alternating very high pressure in squeeze film space 20 where space 20 is squeezed to a minimum, and reduced pressure in the opposite region where space 20 is at a maximum. Alternating pressure in this manner causes oil in squeeze film space 20 to flow circumferentially with a non-uniform circumferential pressure distribution.

As described, orbiting motion causes a generally non-uniform oil pressure in space 20 so that fluid pressure in space 24 may be at a maximum during one half of a revolution of shaft 15 when squeeze film space is at a minimum. However, at the opposite region where space 20 is at a maximum there is a significantly lower pressure, and, for this reason, a ring 22 may unseat from engaging the opposite wall 19 of chamber 17 with attendant oil leakage and diminishing effectiveness of the damper. Various oil control means have been proposed which attempt to limit oil loss from a damper, and particularly, to supply oil to space 20 when space 20 is at a maximum with lower oil pressure.

Figure 2:
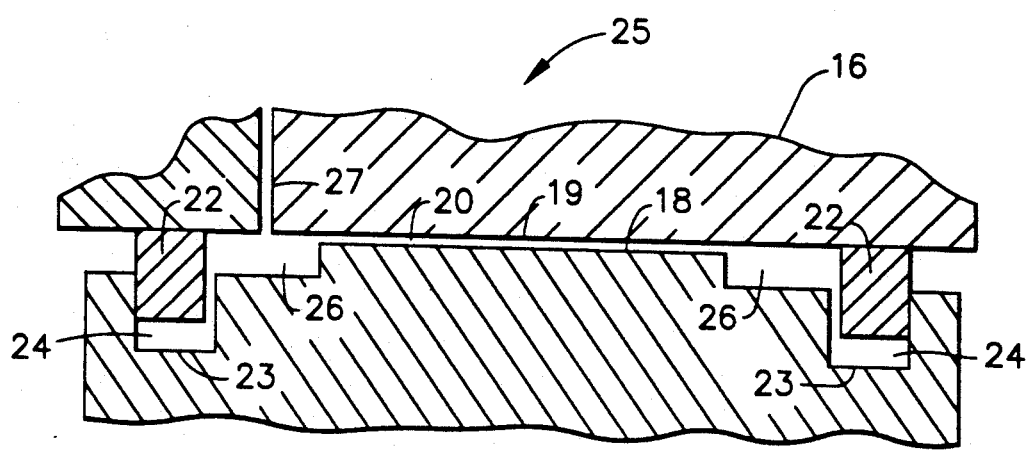
FIG. 2 is a cross-sectional and schematic illustration of a damper assembly utilizing oil filled annular plenum grooves at opposite ends of a squeeze film space.

One modification to ameliorate this condition includes the provision of annular oil plenums or reservoirs in the outer race 13 on opposite sides of squeeze film space 20 as illustrated in the damper of FIG. 2.

Referring now to FIG. 2, a squeeze film damper assembly 25 similar to damper assembly 10 of FIG. 1 includes a similarly defined squeeze film space 20 between an outer race 13 and bearing housing 16. The outer surface 18 of race 13 includes concentric plenum grooves or reservoirs 26 adjacent the usual sealing piston rings 22. These circumferential plenum grooves 26 represent an additional and annular volume of oil in open fluid flow communication with squeeze film space 20 not only when space 20 is compressed to a minimum, during maximum radial motion of shaft 15, but also at the opposite region where space 20 becomes maximum.

In this cycle of events, a plenum 26 receives high pressure oil exiting from a minimum space 20 and permits the oil to move circumferentially in its groove to where space 20 is at a maximum with lower oil pressure. At this point a plenum 26 serves to supply oil to the squeeze film space. In this connection, plenums 26 also serve as a lower oil pressure region which facilitates admitting oil from an external oil supply system into a lower oil pressure region of the damper as illustrated by inlet conduit 27 of FIG. 2 connecting directly to plenum 26.

Because the depth of a plenum 26, as illustrated in FIG. 2, is greater than the thickness of the squeeze film space, the high pressures generated in the squeeze film space are not concurrently generated in the plenum to interfere with its function. Depth of plenum 26 may be limited because of the presence of an adjacent piston ring groove. Increasing the width of a plenum groove to make a plenum groove larger, is not desirable because a large shallow plenum would not only lessen the active length of the squeeze film space, but also may act as a part of a much thicker squeeze film space and generate higher pressure pulses, as compared to deeper plenum, which would inhibit entry of oil from an external supply directly into the plenum.

The use of a spring ring seal in accordance with this invention provides more space for plenums by replacing piston ring seals. A spring ring seal is shown in FIG. 3.

Figure 3:
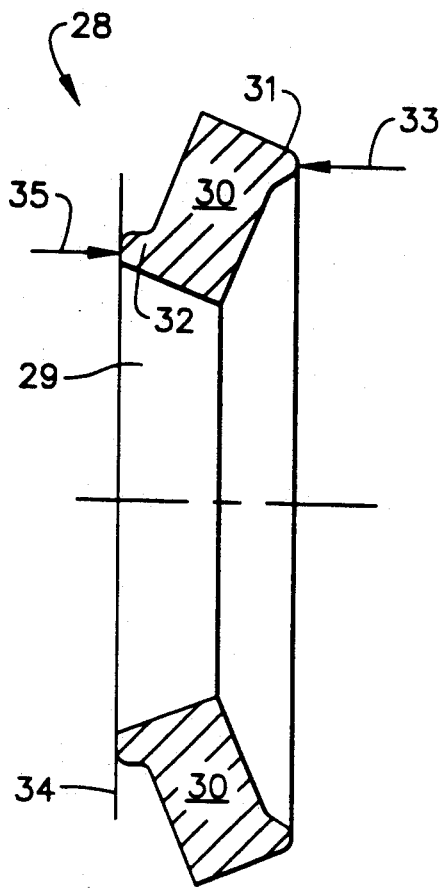
FIG. 3 is a cross-sectional view of a spring ring of this invention.
Figure 4:
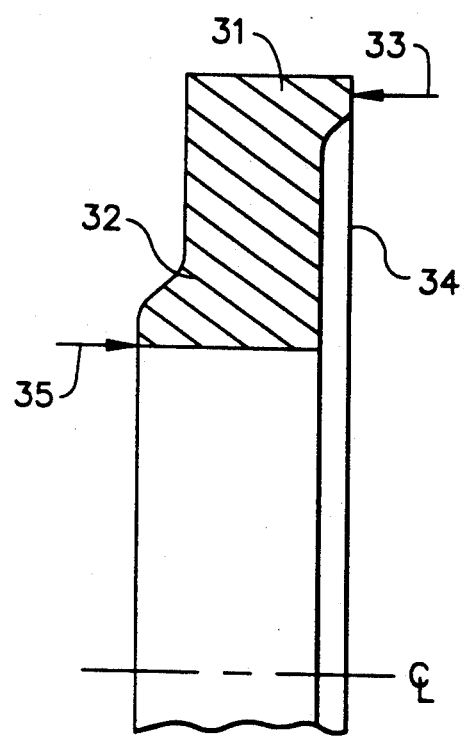
FIG. 4 is a cross-sectional and schematic illustration of the spring ring of FIG. 3 flexed to its operative state.

Referring now to FIG. 3 spring ring seal 28 comprises a coned or dished washer-like structure generally similar to a Belleville spring with a concentric and correspondingly coned aperture 29. In cross-section, ring 28 is defined by circumferential rim 30 which may be described as having a generally rectangular cross-section with axially oppositely projecting nibs or rib protuberances 31 and 32 at opposite ends of one diagonal of the rectangular section. As illustrated in FIGS. 3 and 4, when an axial force 33 is applied peripherally on outer rib 31, with ring 28 being pressed in planar to planar relationship to a wall or surface 34 there is a resultant opposite and radially spaced peripheral force 35 on inner rib 32. Opposite and radially spaced apart peripheral forces 33 and 35 attempt to flatten the dish shape by bending or flexing rim 30 into a more planar or parallel relationship with wall 34 is illustrated in FIG. 4. This flexing or spring action transfers axial and radially outer force 33 to a smaller radius and opposite peripheral force 35. Alternatively, if force 35 is applied coaxially and peripherally on nib 32 the resultant force 33 will be equally peripherally distributed on rib 31 of a larger and radially displaced periphery. It is the transfer of the larger radius force 33 to a smaller radius force 35 which is advantageously applied as a spring seal in a damper assembly. A modified damper assembly incorporating the combination of a spring ring seal and plenum groove is illustrated in FIG. 5.

Figure 5:
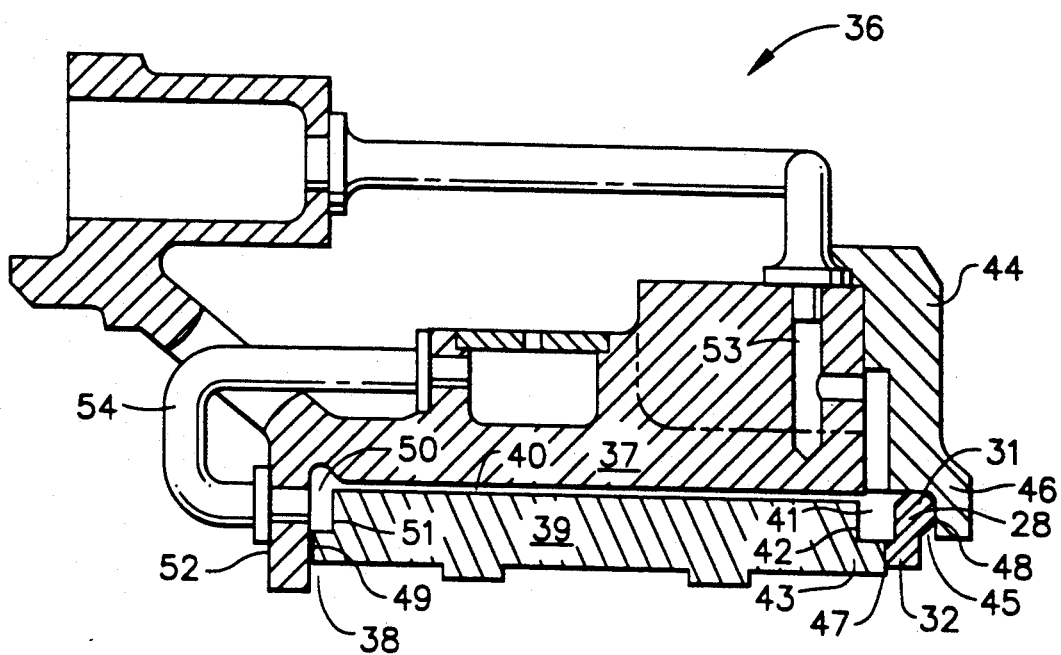
FIG. 5 is a schematic and cross-sectional illustration of an improved plenum damper employing spring ring seals of this invention.

Referring now to FIG. 5, damper assembly 36 comprises a bearing housing 37 having an annular chamber 38 therein in which a rolling element bearing outer race 39 resides in reciprocating relationship to define a squeeze film space 40. At one end of space 40 a plenum and seal cavity 41 is defined by an annular concentric cutaway or necked down portion 42 of race 39 having a remaining axially projecting rim 43, and an overhanging housing part 44 which is spaced from and overlies race 39 to define an annular lip recess 45. A spring ring 28 is fitted in recess 45 as illustrated. Housing part 44 may conveniently comprise an end plate or cover assembly with a recessed central section having an annular lip 46 which overhangs an end of race 39 to provide the annular lip recess 45 with lip 46 axially engaging spring ring 28 along its rib 31. As illustrated in FIG. 5, spring ring 28 which is fitted in recess 45 not only serves as a sidewall to plenum chamber 41, but also utilizes its described sealing characteristics to seal plenum 41. Overhanging housing part 46 of end plate 44 exerts an axial force peripherally on outer rib 31 with a resultant sealing force being peripherally distributed on inner rib 32. Seal 28 provides a biasing seal at ring junctures 47, 48 and opposite race juncture 49. As illustrated in FIGS. 3 and 4, spring ring 28 of FIG. 3 shows ring 28 in its normal non-flexed condition, while FIG. 4 shows ring 28 in its fully flexed condition. Considerable biasing force is obtainable in the transition from FIG. 3 to FIG. 4 through flexing of rim 30 tending to widen the conical angle.

At the opposite end of squeeze film space 40, race 39 has a corresponding plenum chamber 50 defined by a cutout 51 in race 39 and an overlying part 52 of housing 37 which is the opposing wall of annular chamber 38.

It is an important feature of damper assembly 36 of FIG. 5, that the combination of the clamping action of end plate 44, or other housing assembly arrangement on seal 28, may be correlated with seal forces at junctions 47, 48, and 49 to permit necessary radial motion of race 39 in housing 37. Normal damper operation wherein some shaft orbiting takes place, results in a tendency of the outer bearing race 39 to rotate in its chamber 38. For this reason the outer race of rolling element dampers are fitted with an appropriate mechanical restraint to prevent race rotation. In the present invention, end plate 44 clamping forces and seal 28 flexing may be correlated to provide both the sealing and non-rotating functions. Furthermore, proper diametrical tolerances and fit of ring 28 will provide a satisfactory seal at point 53 at the extreme periphery of seal 28.

Since the described plenum chambers 41 and 50 are positioned at the extreme ends of squeeze film space 40 in side adjacent relationship, they may be formed with a significant depth and not generate high pressure as found in squeeze film space 40. Accordingly, sealing a lower pressure region by means of a spring seal 28 is facilitated, and, correspondingly, supplying oil to the damper through a low pressure plenum is advantageous. An oil inlet conduit 53 supplies oil to one lower oil pressure plenum 41 while oil exits damper 36 from plenum, 50 through an appropriate exit conduit 54. Moreover, use of a spring seal 28 not only provides more axial space for a plenum chamber, by eliminating piston rings, but also permits relocation of plenums for maximum advantage of plenum size and effective length of squeeze film space 40.

The spring seal of this invention is equally applicable to dampers referred to as closed end dampers as illustrated in FIG. 1, suitably modified by use of a spring ring end seal which obviates the use of piston ring seals. One such modification is illustrated in FIG. 6.

Figure 6:
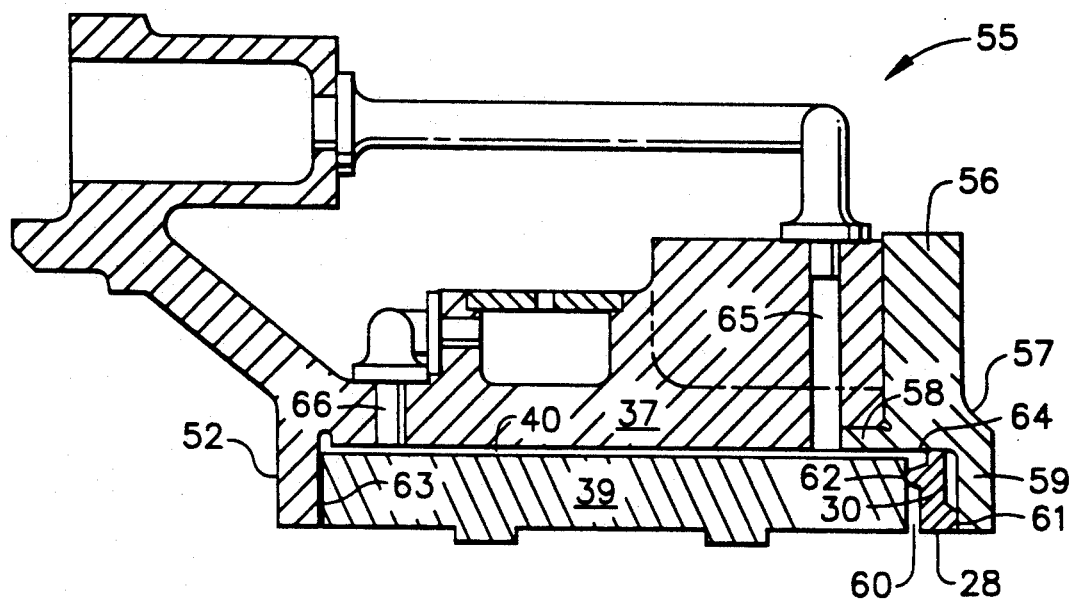
FIG. 6 is a schematic and cross-sectional view of a closed end damper with a spring ring end seal of this invention.

Referring now to FIG. 6, damper assembly 55 follows the same general structure as damper assembly 36 of FIG. 5 and uses the same general part numerals where applicable. In FIG. 6, an overhanging housing part or end plate 58 for damper assembly 55 includes a recess boss 57 having an inwardly projecting rim 58 which overlies and forms an end section of squeeze film space 40, and a right angle annular depending section 59 which overhangs and is spaced from one end of race 39 to provide a seal cavity 60 therebetween. Rim 30 of a spring seal 28 (FIG. 3) of this invention is fitted into cavity 60 so that end plate 56, when assembled into planar end abutting relationship with housing 37 provides a spring action or biasing seal at junctures 61, 62, and 63. Proper dimensioning of spring seal 28 will also provide sealing at peripheral juncture 64.

In operation of closed end damper 55, damper oil is admitted into squeeze film space 40 through one or more circumferentially spaced inlet conduits 65. Radial motion of race 39 causes compression or squeezing of the oil film in squeeze film space 40 and a flow of oil axially and circumferentially. At one end, spring seal 28 limits any flow of oil out of squeeze film space 40. The described flexing of spring seal 28 in chamber 60 against race 39 provides sealing at juncture 63 at the opposite end of squeeze film space 40. Required oil flow through the damper is effectuated by means of inlet and oil exit conduit 65 and 66.

Figure 7:
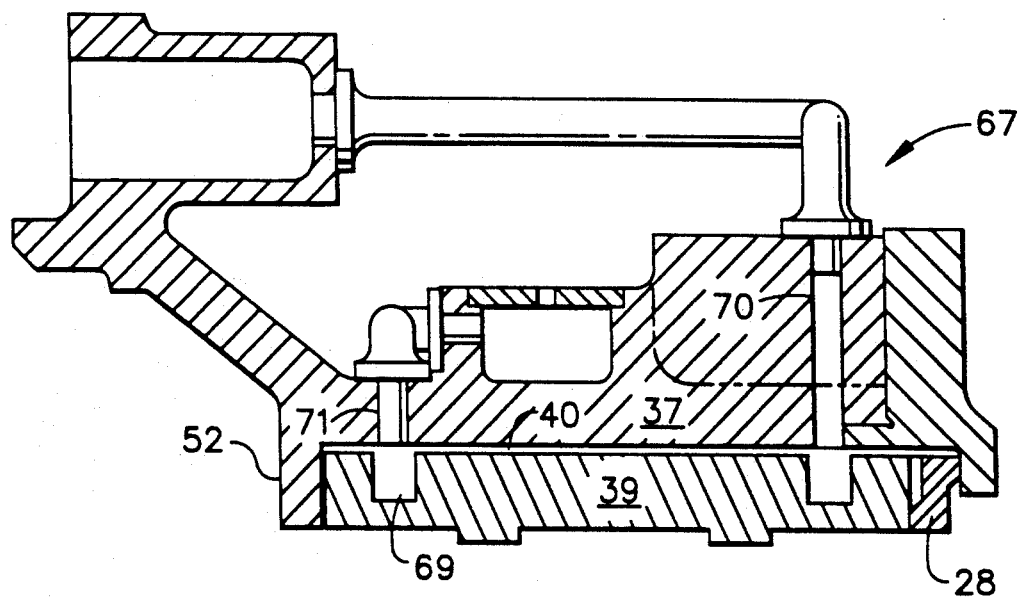
FIG. 7 is a schematic illustration of a dual plenum damper with a spring ring end seal of this invention together with a plenum oil system.

Another advantageous combined damper oil inlet and exit system for spring ring sealed dampers is illustrated in FIG. 7.

Referring now to FIG. 7 damper assembly 67 is generally similar to damper assembly 55 of FIG. 6. However, damper assembly 67 includes spaced apart, deep, oil filled plenum grooves 68 and 69 in outer race 39 wherein, as described, the volume of oil is at a significantly lower pressure than oil in squeeze film space 40. Accordingly, an improved oil system is employed which admits damper oil directly and radially into plenum 68 adjacent spring seal 28 by means of an appropriate conduit 70 and controls oil exiting from damper assembly 67 directly from the other plenum 69 through an appropriate radial conduit 71 where conduits 70 and 71 are located in housing 37. Additional damper sealing may be accomplished with an appropriately located mechanical seal as illustrated in FIG. 8.

Figure 8:
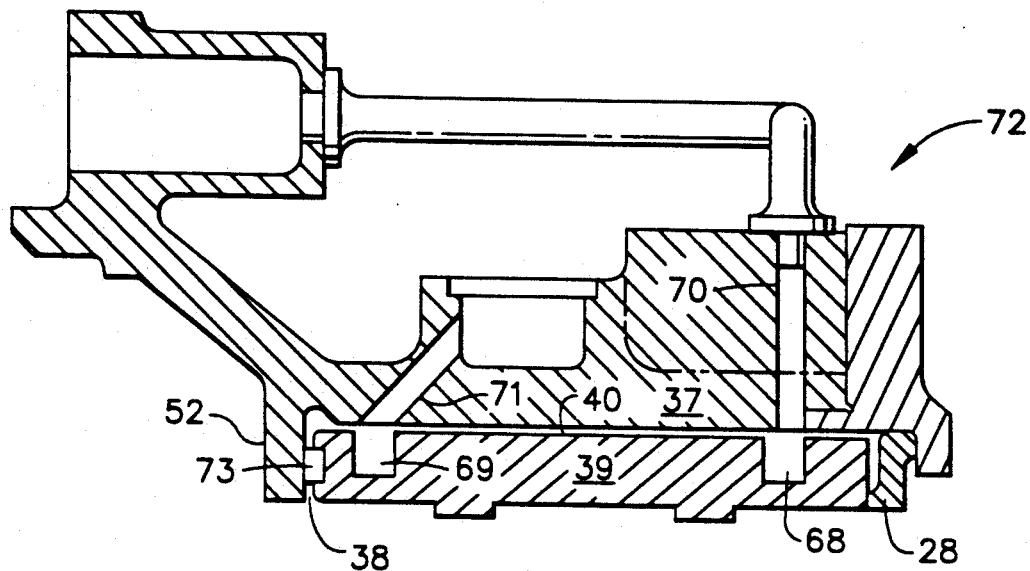
FIG. 8 is a schematic illustration of the damper of FIG. 7 together with an additional oil seal.

Referring now to FIG. 8, a damper assembly 72 is generally similar to assembly 67 of FIG. 7. Assembly 72 includes further groove fitted seal means 73 at the end of race 39 opposite spring seal 28, and between race 39 and the opposed housing wall 52 of annular chamber 38 in housing 37. Seal means 73 may be of an appropriate solid material rubbing or sliding seal and acts as an adjunct seal to spring seal 28 for further control of oil flow from squeeze film space 40 at the contact area of seal 73 with housing 37, as well as to better accommodate wear at this juncture.

Figure 9:
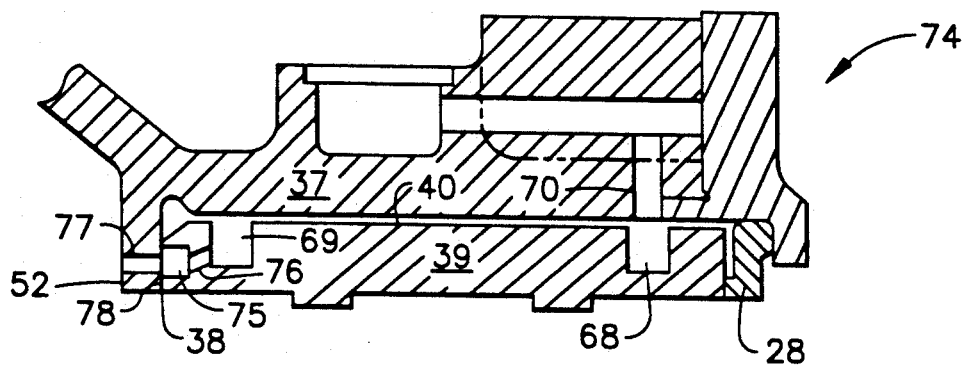
FIG. 9 is a schematic illustration of the damper of FIG. 7 with an addition of a further and axial plenum together with a plenum oil system.

A modified plenum oil control system is illustrated in FIG. 9.

Referring now to FIG. 9, damper assembly 74 is generally similar to damper assembly 72 of FIG. 8 with transposed general part numbers where applicable. In FIG. 9, an additional annular plenum chamber 75 formed axially into the annular planar side surface of race 39 between race 39 and opposing housing wall 52 of chamber 38 in which race 39 is fitted for some reciprocal motion. Plenum 69 and axial plenum 75 are interconnected by an oil passage 76 so that plenums 69 and 75 are in fluid flow communication with high pressure oil in squeeze film space 40. However, because of their location and size, damper oil in axial plenum 75 is at a significantly lower pressure than oil in squeeze film space 40 and withdrawing oil from plenum 75 is facilitated. For this purpose a further oil exit passage 77 in housing wall 52 conducts oil to an appropriate oil system conduit. Moreover, lower oil pressure in axial plenum 75 aids in reducing oil loss at juncture 78.

This invention discloses and describes an improved shaft damper assembly employing a spring ring seal for its squeeze film space in combination with improved oil plenum size and location and their oil supply systems.

While this invention has been disclosed and described with respect to preferred embodiments thereof, it will be understood by those skilled in the art that various changes and modifications may be made without departing from the scope of the invention as recited in the following claims.

What is claimed;

1. In a squeeze film shaft damper having a bearing housing with an annular chamber therein and an annular bearing support member fitted in said chamber for limited radial motion and defining a thin annular squeeze film space between opposing circumferential planar surfaces of said bearing support member and said annular chamber, an improvement therefore comprising
    (a) a part of said housing overlying and spaced from said bearing support on one side thereof to define an annular recess therewith, and
    (b) an annular conical spring ring seal positioned compressingly in said recess to circumferentially seal said squeeze film space, and
    (c) wherein a flexing action of said spring ring seal in said recess transfers an axial force acting on a radially outer rib of said spring ring seal to an axially opposing force acting on a radially inner rib of said spring ring seal.

2. The invention as recited in claim 1 wherein said flexing action of said seal in said recess provides a biasing seal at junctures between said outer rib of said seal and an adjacent housing wall, said inner rib of said seal and an adjacent axially facing end of said annular bearing support member, and between an opposite axially facing end of said annular bearing support member and an axially opposite wall of said housing.

3. In a squeeze film shaft damper having a bearing housing with an annular chamber therein and an annular bearing support member fitted in said chamber for limited radial motion and defining a thin annular squeeze film space between opposing circumferential planar surfaces of said bearing support member and said annular chamber, an improvement therefore comprising
    (a) a part of said housing overlying and spaced from said bearing support member on one side thereof to define an annular recess therewith, and
    (b) an annular conical spring ring seal positioned compressingly in said recess to circumferentially seal said squeeze film space; and (c) wherein said spring ring seal comprises
  (1) an annular rim in the form of a wide angle conical configuration,
  (2) said rim having a generally rectangular cross section with oppositely axially directed radially inner and outer ribs at the ends of a diagonal of said cross section, said spring ring seal rim positioned in concentric relationship to said annular bearing support member with said rim positioned in said recess with its outer rib protuberance in periphery contact with said overhanging housing part, and the inner rib in periphery contact with said bearing support member so that compression of said rim in said recess flexes said rim to increase its conical angle to provide bearing forces of said ribs on said housing and said annular bearing support for sealing purposes.

* * * * *